(12) United States Patent
Dietrich (10) Patent No.: US 8,373,092 B2
(45) Date of Patent: Feb. 12, 2013

(54) PURGE AND SEALANT CAP FOR SELECTIVE LASER SINTERING BUILD FRAME

(75) Inventor: David M. Dietrich, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 1344 days.

(21) Appl. No.: 12/099,887

(22) Filed: Apr. 9, 2008

(65) Prior Publication Data

US 2009/0255912 A1 Oct. 15, 2009

(51) Int. Cl.
*B22F 3/105* (2006.01)
*B29C 35/08* (2006.01)
*B23K 26/12* (2006.01)

(52) U.S. Cl. ............ 219/121.86; 219/121.6; 219/121.85

(58) Field of Classification Search ............... 219/121.6, 219/121.85, 121.86, 400; 264/497; 99/483; 454/270–299; 425/174
See application file for complete search history.

(56) References Cited

U.S. PATENT DOCUMENTS

| | | | | |
|---|---|---|---|---|
| 5,207,614 A * | 5/1993 | Passadore | | 454/298 |
| 5,681,492 A * | 10/1997 | Van Praet | | 219/400 |
| 6,148,761 A * | 11/2000 | Majewski et al. | | 118/715 |
| 6,215,093 B1 * | 4/2001 | Meiners et al. | | 219/121.61 |
| 6,461,435 B1 * | 10/2002 | Littau et al. | | 118/715 |
| 2005/0116391 A1 * | 6/2005 | Lindemann et al. | | 264/497 |
| 2005/0183827 A1 * | 8/2005 | White et al. | | 156/345.34 |
| 2007/0057412 A1 | 3/2007 | Weiskopf et al. | | |
| 2007/0132158 A1 * | 6/2007 | Martinoni et al. | | 264/497 |

\* cited by examiner

*Primary Examiner* — Geoffrey S Evans
(74) *Attorney, Agent, or Firm* — Novatech IP Law (57) ABSTRACT

A selective laser sintering apparatus is adapted contain or receive a build frame and comprises a cap assembly which includes a removable plate assembly having at least one gas inlet formed therein. The removable plate assembly sealingly covers the build frame. The cap assembly further comprises at least one gas line fluidly connectable to the gas inlet via a gas port to deliver inert gas to the interior of the build frame. The plate assembly comprises upper and lower plates defining a spacing therebetween. A seal extends around a periphery of the upper and lower plates and is sandwiched therebetween to enclose the spacing. The lower plate has a plurality of gas inlets formed therein which are in fluid communication with the spacing such that inert gas may be delivered to the build volume while the cap assembly is installed thereupon.

21 Claims, 8 Drawing Sheets

PURGE AND SEALANT CAP FOR SELECTIVE LASER SINTERING BUILD FRAME

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to rapid prototyping and manufacturing and, more particularly, to a purge and sealant cap assembly for use on a build frame of a selective laser sintering apparatus.

BACKGROUND

Selective laser sintering (SLS) is a well-known process for rapidly producing three-dimensional objects from a variety of powder materials. Initially intended for fabricating prototype parts, SLS is now commonly used to fabricate end-use parts in a cost-effective and economical manner and with a high degree of accuracy. For example, SLS is used to fabricate ducting for environmental control systems such as for aircraft due to the lack of geometry constraints when forming such ducting. For example, ducting may have complex curvatures, shapes and/or intricate surface features that can readily be formed using SLS technology. SLS manufacturing is also used to fabricate relatively complex parts, both large and small, for a variety of industries including the automotive, aerospace, and medical industries. For example, fuel tanks can be readily formed using SLS as can dental prostheses, implants and crowns.

In SLS, an energy beam such as a laser beam is focused upon successively-applied layers of powder material. A wide range of powder materials can be used in SLS fabrication including, but not limited to, ceramic materials, metallic materials such as titanium, aluminum and alloy mixtures as well as polymeric materials such as polycrystalline polymeric powders. One such polymeric material commonly used in the production of end-use articles is nylon. In this regard, a relatively large portion of SLS parts are produced using commercial grades of nylon such as Nylon 11 and Nylon 12 due to their favorable mechanical properties (e.g., abrasion resistance) and chemical resistance.

During the SLS process, the laser beam is applied to a desired cross sectional region of the powder material using computer data such as a computer aided design (CAD) file of the finished build part. The application of the laser beam upon the powder material solidifies each layer and fuses the solidified layer to the previously solidified layer. During the SLS process, a vertically movable build platform which supports the powder material is incrementally lowered layer-by-layer as each layer is solidified. New layers of powder material are applied over previously solidified layers and are fused to the solidified layers. The process of incrementally solidifying layers is repeated until the build part is completed. The build part is contained with the unsolidified powder and is referred to as a part cake. The unsolidified powder is removed from the part cake to expose the finished build part following an appropriate cool down period.

Unfortunately, once the build part is completed, it is desirable to prevent the infusion of oxygen into the part cake which can cause oxidation of the build part. Oxidation may be undesirable the build part may be adversely affected and the build part may take on a brownish coloring. One method of preventing oxidation is to maintain the build frame in an inert atmosphere while the part cake cools. In this method, the build frame may be left inside the inert atmosphere of the SLS machine during cool down. Unfortunately, the cool down period can last up to several days during which time the SLS machine is unavailable for fabricating additional parts.

Various other methods have been employed to prevent oxidation of the build part but which allow for removal of the build frame from the SLS machine. One such method is to add anti-oxidant agents to the powder material. In the case of commercial grade nylon such as Nylon 12 powder, anti-oxidant agents are blended into the powder to prevent oxidation of the build part. Unfortunately, Nylon 12 powder is relatively expensive due to the addition of such anti-oxidants. The relatively high cost of Nylon 12 powder increases the end cost of parts as compared to other nylon grades such as Nylon 11 which lacks anti-oxidant agents but which exhibits improved mechanical properties.

Another drawback associated with the use of Nylon 12 is that certain SLS machine manufacturers employ a micro-chipping technique with the powder material. More specifically, some SLS machine manufacturers include a microchip in the powder canisters. The microchip is sensed by the SLS machines that are sold by the manufacturer such that the SLS machines cannot be operated unless the microchip is detected. In this manner, purchasers of the SLS machines must also typically purchase the micro-chipped powder at increased cost to the purchaser.

Other grades of nylon are commercially available but lack the microchip mechanisms. For example, Nylon 11 is similar to Nylon 12 but has several advantages over Nylon 12. For example, Nylon 11 is approximately one-third the cost of Nylon 12. Furthermore, Nylon 11 exhibits better mechanical properties as compared to Nylon 12. In one type of powder composition, Nylon 11 exhibits a tensile strength of 48 megaPascals (MPa) as compared to a tensile strength of 25 MPa for Nylon 12. Even further, Nylon 11 exhibits improved abrasion resistance, better impact strength and a lower tensile modulus as compared to Nylon 12.

Unfortunately, in order to make effective use of Nylon 11 in SLS manufacturing, methods must be employed to prevent oxidation of the build part. One solution includes the blending of anti-oxidant agents into the Nylon 11 powder similar to the agents that are added to Nylon 12. Unfortunately, the addition of anti-oxidant agents increases costs and production time due to the additional processing. A second solution for preventing oxidation of build parts fabricated from Nylon 11 includes waiting for an appropriate period of time for the build part to cool down in the inert atmosphere of the SLS machine. Unfortunately, as was earlier mentioned, doing so would prevent SLS fabrication during the 3-4 day cool down period resulting in an underutilization of the SLS machine.

As can be seen, there exists a need in the art for a system and method for enabling SLS part production using powder material that is devoid of anti-oxidant agents. More particularly, there exists a need in the art for a system and method of SLS part production using Nylon 11 which does not require the addition of anti-oxidant agents. Furthermore, there exists a need in the art for a system and method for fabricating build parts from Nylon 11 powder material without waiting for an extended period of time for cool down of the build part while the build frame is inside the SLS machine. Finally, there exists a need in the art for a system and method for fabricating build parts from Nylon 11 powder material which is simple, low in cost and which is convenient to use.

BRIEF SUMMARY

The present disclosure specifically addresses the above-described needs associated with selective laser sintering (SLS) of build parts using Nylon 11 material. More specifically, in one aspect of the disclosure, a laser sintering apparatus may be utilized with a build frame being provided with a removable cap assembly in order to prevent intrusion of oxygen into a build volume of the build frame during cool down of the build part. In one embodiment, the cap assembly may comprise a plate assembly which is sized and configured to sealingly cover the build frame. The plate assembly preferably has at least one and, more preferably, a plurality of gas inlets formed therein for delivering gas such as an inert gas to the interior of the build frame.

The technical effects of the embodiments disclosed include the capability for minimizing or preventing infusion of oxygen into the build part with the build frame being removed from the SLS process chamber. In this manner, the cap assembly permits fabrication in the SLS apparatus using a second build frame while the initial build frame cools down outside of the SLS apparatus. The cap assembly may comprise at least one and, more preferably, a plurality of gas lines which are fluidly connectable to the gas inlets. The gas inlets are preferably substantially uniformly distributed throughout the plate assembly in order to allow for even distribution of inert gas such as nitrogen ($N_2$) into the part cake following completion of the build part.

In one embodiment, the plate assembly may be comprised of upper and lower plates which may define a spacing therebetween. A gasket or seal may extend along a periphery of the upper and lower plates and may be sandwiched or captured therebetween such that the seal and the upper and lower plates collectively enclose the spacing. The upper plate may include a plurality of gas ports each being connectable to at least one gas line. The lower plate preferably has a plurality of the gas inlets formed therein. The spacing between the upper and lower plates provides fluid communication between the gas inlets and the gas ports and facilitates even distribution of the inert gas into the part cake following completion of the build part.

The cap assembly is specifically configured to sealingly engage an interior surface of side walls that make up the build frame. The cap assembly is preferably configured to be movable vertically within the build frame. The cap assembly also preferably includes a distribution fitting which is configured to be connectable to the gas ports via the gas lines. The distribution fitting is preferably configured as a one-way fitting and, more preferably, is a quick disconnect type fitting wherein the valve is oriented to prevent intrusion of oxygen into the gas lines but allowing inert gas (e.g., nitrogen gas) to flow into the build frame when the distribution fitting is connected to a gas source such as a gas bottle, gas tank or compressor. The gas source is configured to be connectable to the distribution fitting (e.g., via the one-way quick disconnect fitting) for delivering gas to the gas lines.

The cap assembly may further comprise a valve which is mountable on the upper plate and which is preferably configured as a one-way valve such as a bleed valve. The bleed valve preferably prevents intrusion of oxygen into the build frame while permitting the build frame to vent as inert gas (e.g., nitrogen gas) is delivered to the build volume of the build frame.

The build part may be constructed on a vertical movable platform of the build frame by successive layering of powder material on the platform followed by successive solidification of such layers in the SLS process. The layers of powder material are successively applied and solidified using a focused or directed energy beam such as a laser beam provided by one and, more preferably, a pair of laser devices. Each of the laser beams solidifies a cross section of the build part with the build platform being incrementally moved vertically downwardly as each layer is applied and solidified until the build part is completed.

Following completion of the build part, the build frame is covered with the cap assembly and gas is delivered to the build volume through the gas lines whereafter the gas is distributed to the part cake through the gas inlets. The delivery of gas to the build volume prevents infusion of oxygen into the build part which prevents oxidation thereof. Excess pressure within the build volume may be vented through the one-way bleed valve or through the seal of the cap assembly or bottom plate of the build frame.

The gas that is delivered to the build volume may comprise a variety of inert gases including, but not limited to, nitrogen, argon, helium and other gases and combinations thereof. A wide range of powder materials can also be used in the SLS process disclosed herein including, but not limited to, ceramic powder, metallic powder such as titanium, aluminum and alloy mixtures as well as polymeric powder materials such as polycrystalline polymeric powders. In a preferable embodiment, the powder material is preferably any suitable polycrystalline polymeric material such as a nylon-based material. A most preferably embodiment of the powder material is Nylon 11 which is preferably provided in a composition that is devoid of anti-oxidant additives.

Advantageously, the ability to use Nylon 11 as the powder material provides a significant cost reduction compared to Nylon 12 material by obviating the need for anti-oxidants. Furthermore, the ability to use Nylon 11 results in finished build parts having improved mechanical properties compared to parts fabricated of Nylon 12 material.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

These and other features of the present disclosure will become more apparent upon reference to the drawings wherein like numbers refer to like parts there throughout and wherein.

DETAILED DESCRIPTION

Figure 1:
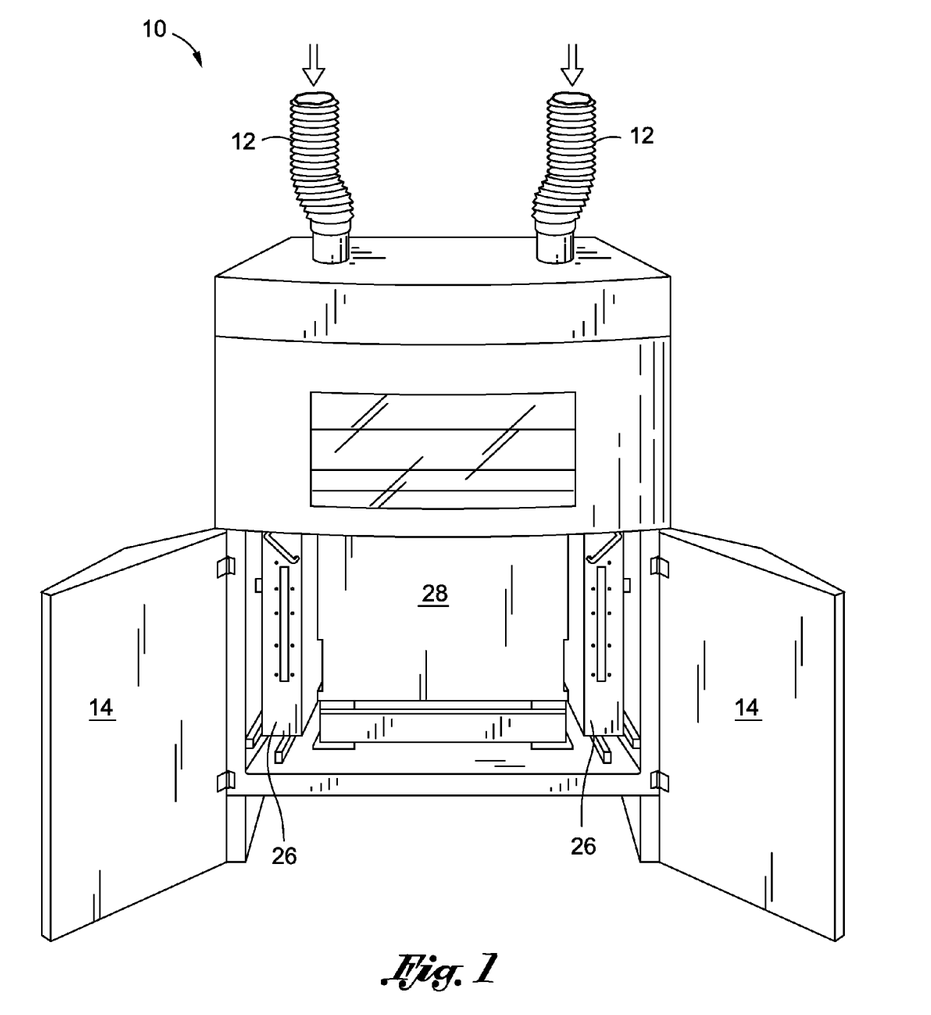
FIG. 1 is a perspective illustration of a selective laser sintering (SLS) apparatus adapted to contain a removable build chamber or build frame.

Referring now to the drawings wherein the showings are for purposes of illustrating preferred and various embodiments of the disclosure only and not for purposes of limiting the same, FIG. 1 is a perspective illustration of a selective laser sintering (SLS) apparatus 10 which may be adapted to removably receive a build frame 28 therewithin. In one embodiment, the SLS apparatus 10 illustrated in FIG. 1 may be similar to that which is disclosed in U.S. Pat. No. 7,153,463 issued to Leuterer et al. on Dec. 26, 2006, the entire contents of which is incorporated by reference herein. As can be seen in FIG. 1, the build frame 28 can be seen installed in a process chamber of the SLS apparatus 10 wherein the process chamber is exposed upon opening of a pair of doors 14.

In one embodiment, the SLS apparatus 10 may be configured such that the build frame 28 may be removably inserted or docked inside the SLS apparatus 10 (e.g., process chamber) such as via the use of a forklift to move and lift the build frame 28 into position. Due to the use of a removable cap assembly 50 as described further herein, production parts may be rapidly produced by inserting the build frame 28 into the process chamber followed by removal thereof to allow for installation of a second build frame 28 into the process chamber for production of a new set of parts. In this manner, the production capabilities of the SLS apparatus 10 may be maximized.

In addition, the cap assembly 50 permits usage of powder material that is devoid of anti-oxidant additives which may otherwise be required to prevent oxidation of the build part. A wide range of powder materials can be used in the sintering method 88 disclosed herein including, but not limited to, ceramic powders, metallic powders such as titanium, aluminum and alloy mixtures as well as polymeric powder materials such as polycrystalline polymeric powders including, but not limited to, nylon-based powders.

Figure 3:
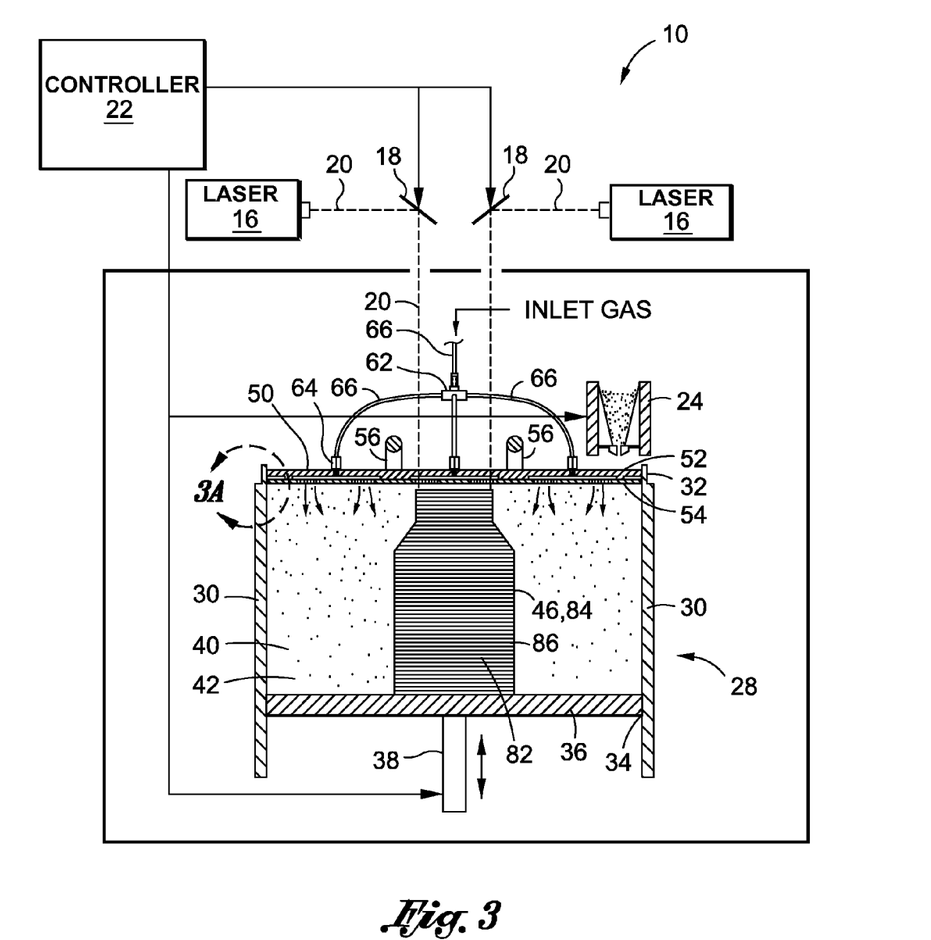
FIG. 3 is a schematic illustration of the SLS apparatus having the build frame mounted therewithin and illustrating a vertically movable build platform supporting a build part and illustrating the cap assembly having a plurality of gas lines.

Referring briefly to FIG. 3, shown is a schematic illustration of the SLS apparatus 10 having the build frame 28 disposed therewithin. In one embodiment, the SLS apparatus 10 includes at least one and, more preferably, a pair of laser devices 16 configured to emit a focused energy beam such as a laser beam 20. A pair of deflection mechanisms 18 may be provided to deflect the laser beams 20 onto a powder bed contained on a vertically movable build platform 36 located inside the build frame 28. In this manner, the SLS apparatus 10 produces the build part 46 in an incremental layering solidification process described in detail below. The laser devices 16 may be regulated or controlled by a controller 22 provided with the SLS apparatus 10 as illustrated in FIG. 3.

The controller 22 may also be operative to regulate vertical movement of the build platform 36 upon which the build part 46 is constructed.

The build platform 36 may be supported by a fabrication piston or support 38 which is incrementally vertically movable by a suitable drive means. The SLS apparatus 10 may further include a powder dispenser 24 for applying successive layers of powder material onto the build platform 36. FIG. 1 illustrates a pair of powder feed lines 12 which supply powder to the powder dispenser 24. The SLS apparatus 10 may further include a pair of powder overflow collection bins 26 on opposing sides of the process chamber to collect excess powder during the application of each layer.

FIG. 3 illustrates the build frame 28 which may be comprised of a plurality of side walls 30 and having the build platform 36 sealingly engaged to the build frame 28 such as through the use of bottom seal 34. Following application of each layer of powder, the laser beams 20 successively solidify and unitize a portion of each layer corresponding to a desired cross section of the build part 28. The controller 22 directs the laser beams 20 onto the desired cross section of the powder layer. The controller 22 may also be configured to regulate operation of the powder dispenser 24 for incrementally applying layers of powder material.

Figure 2:
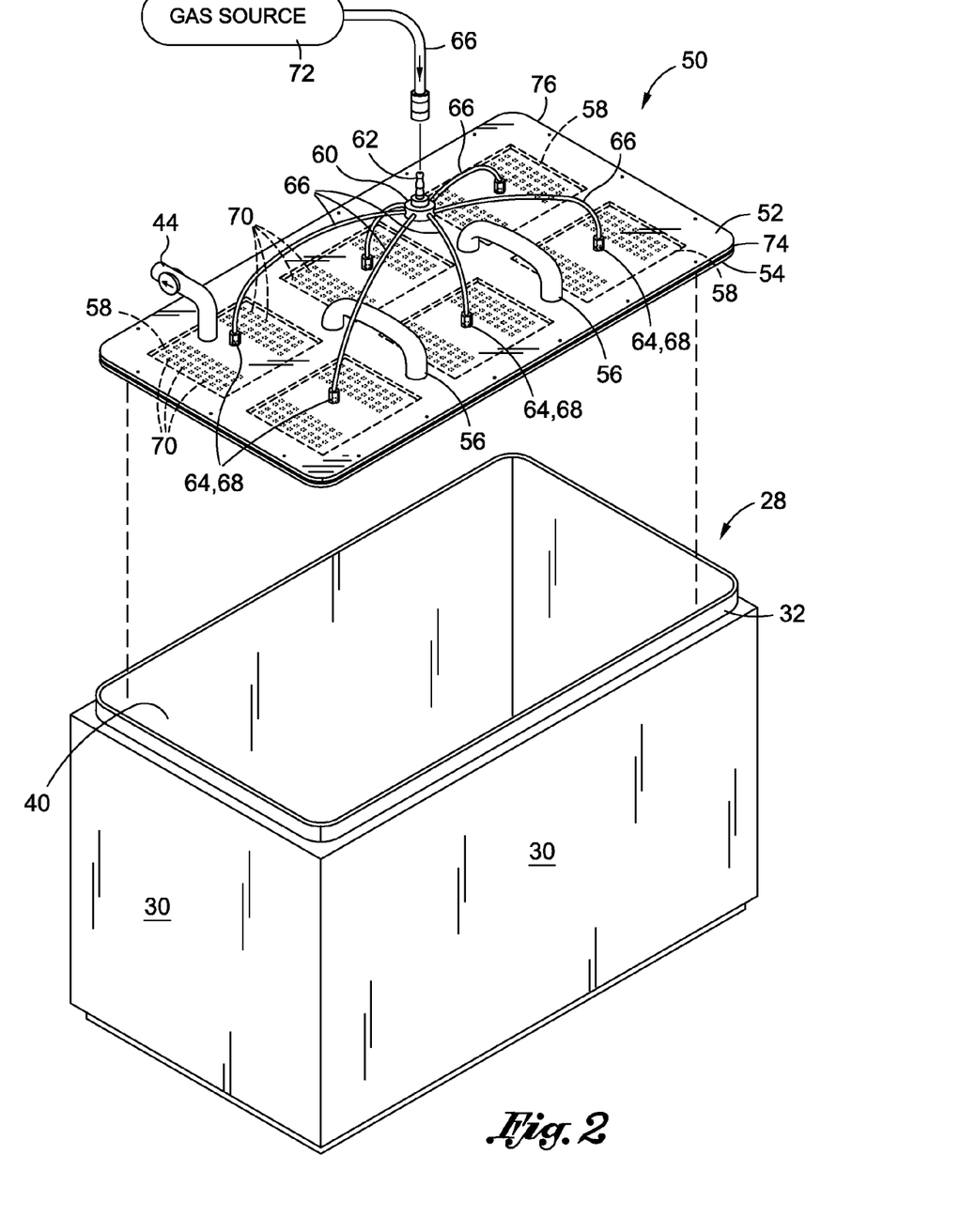
FIG. 2 is a perspective partially exploded view of the build frame having a purge and sealant cap assembly removably disposable thereupon.

Referring to FIGS. 2-3, shown is the build frame 28 having side walls 30 and which may be enclosed at the bottom by the build platform 36 shown in FIG. 3. Although illustrated as having a generally orthogonal or rectangular shape, it is contemplated that the build frame 28 may be provided in a variety of different sizes, shapes and configurations other than that which is shown in FIG. 2. Furthermore, the build frame 28 may be constructed of a variety of materials including, but not limited to, metallic and polymeric materials or combinations thereof.

Referring still to FIG. 2, the build frame 28 may further include the cap assembly 50 which may be adapted for mating to the build frame 28 of the SLS apparatus 10. The cap assembly 50 may comprise a removable plate assembly 76 which may have at least one and, more preferably, a plurality of gas inlets 70 formed therein. The gas inlets 70 are preferably sized and configured to distribute gas to the interior of the build frame 28. The cap assembly 50 may further include at least one and, more preferably, a plurality of gas lines 66 which may be fluidly connected to the gas inlets 70 in order to provide inert gas such as nitrogen gas to the build volume 40.

As can be seen in FIG. 2, in one embodiment, the cap assembly 50 may comprise six separate gas lines 66 which extend from a common distribution fitting 62 to a respective gas port 68 which may be disposable on the plate assembly 76 such as on an upper side thereof. In this regard, the gas ports 68 may be configured as gas fittings 64 which enable fluid connection between the gas line 66 and the gas port 68. Furthermore, the gas ports 68, as was earlier mentioned, are fluidly connectable to the plurality of gas inlets 70 which, in one embodiment, are substantially uniformly distributed throughout the cap assembly 50 in order to facilitate distribution of inert gas to the build part 46 following completion thereof in the SLS apparatus 10.

It is contemplated that the gas for delivery to the interior of the build frame 28 is any suitable inert gas including, but not limited to, nitrogen, helium, neon, argon and any other suitable gas or combinations of gases. The inert gas is provided into an interior of the build frame 28 in order to displace or to prevent infusion of oxygen thereinto which can cause oxidation of the build part 46 during the cooling process.

Figure 4:
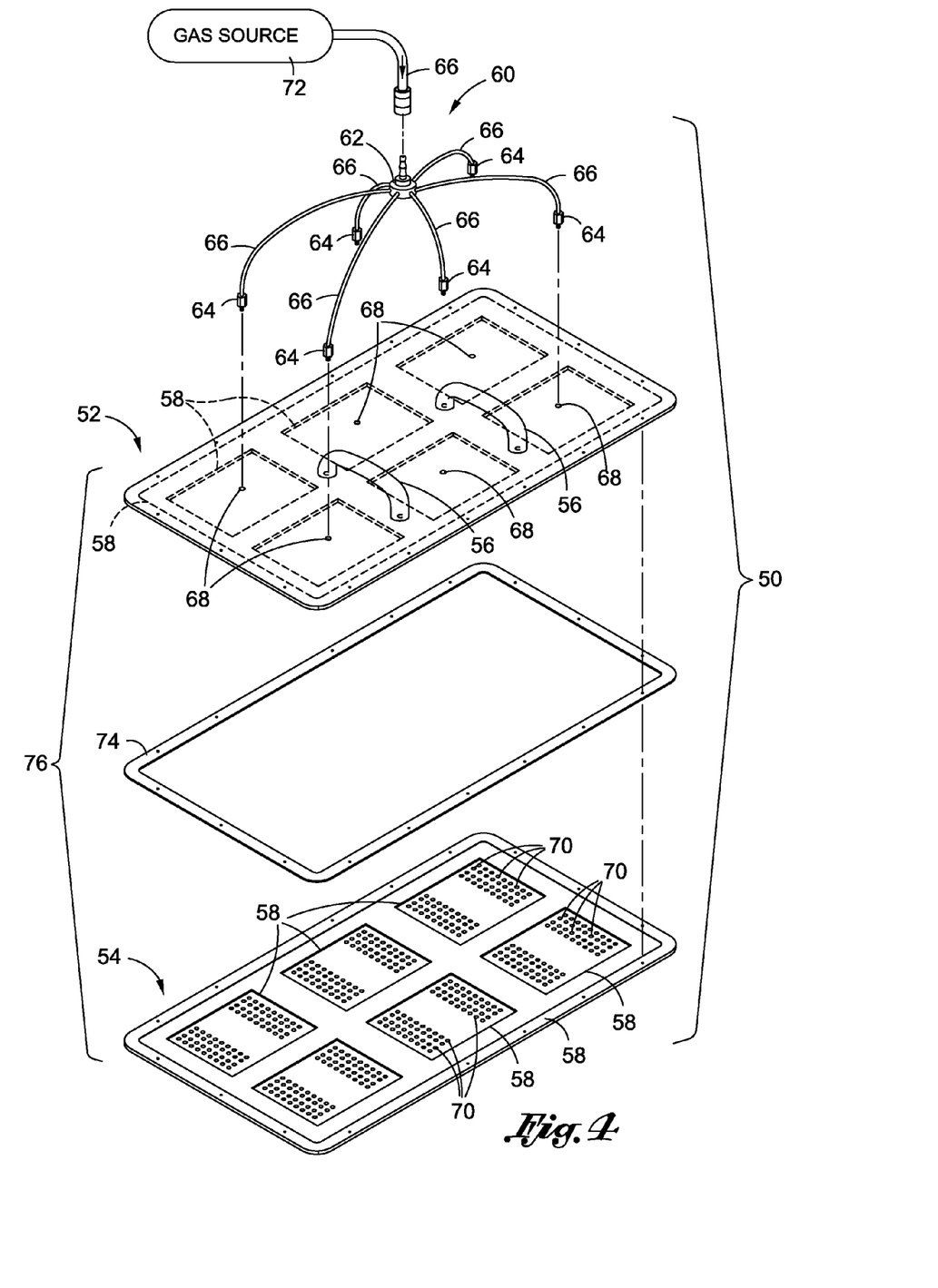
FIG. 4 is an exploded perspective view of the cap assembly illustrating upper and lower plates and having a gasket extending along a periphery of the cap assembly.

Referring to FIG. 4, shown is the plate assembly 76 which, in one embodiment, may be comprised of upper and lower plates 52, 54 which may be disposed in spaced relation to one another. However, it is further contemplated that the upper and lower plates 52, 54 may be disposed in substantially abutting contact with integral fluid passageways being provided to allow for fluid communication between the gas ports 68 and the gas inlets 70. It is further contemplated that the cap assembly 50 may be configured as a unitary structure with gas inlets 70 and gas ports 68 being integrally formed therewithin.

In the embodiment shown in FIG. 4, the upper plate 52 may comprise a plurality of gas ports 68 which may be mounted with gas fittings 64 on an upper side of the plate assembly 76. The gas fittings 64 may be configured to be fluidly connected to the gas lines 66. The lower plate 54 can be seen as having a plurality of relatively smaller diameter gas inlets 70 which are preferably in fluid communication with the gas ports 68.

Figure 3A:
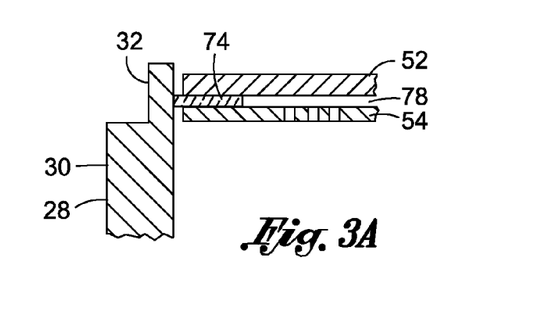
FIG. 3A is a partial enlarged view of the plate assembly in one embodiment illustrating the upper and lower plate disposed in spaced relation to one another and having a seal captured therebetween.

In one embodiment shown in FIG. 3A, the upper and lower plates 52, 54 may be disposed in spaced relation to one another such that a spacing 78 is defined therebetween. The plate assembly 76 may comprise a gasket or seal 74 which, in one embodiment, may extend across a length and a width of the plate assembly 76. The plate assembly 76 may have cutouts 80 formed therein to allow fluid communication between the gas ports 68 and the gas inlets 70. The seal 74 may be slightly overlapping of the edges of the upper and lower plates 52, 54 in order to sealingly engage the interior of the side walls 30.

Figure 5:
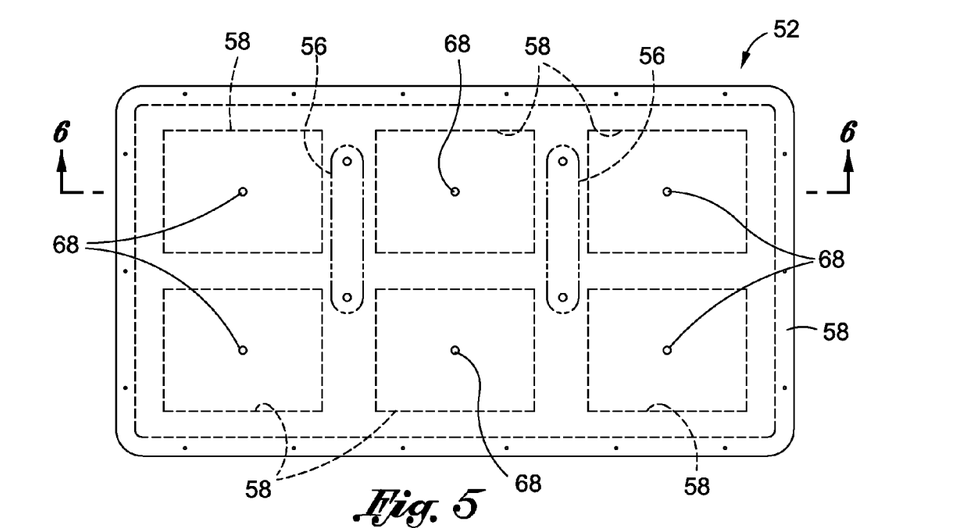
FIG. 5 is a top view of an underside of the upper plate and illustrating a plurality of undercuts and each having a port formed therein for delivering gas to the build chamber.
Figure 6:
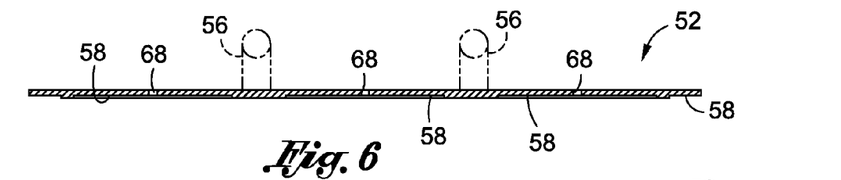
FIG. 6 is a cross section of the upper plate taken along lines 6-6.
Figure 7:
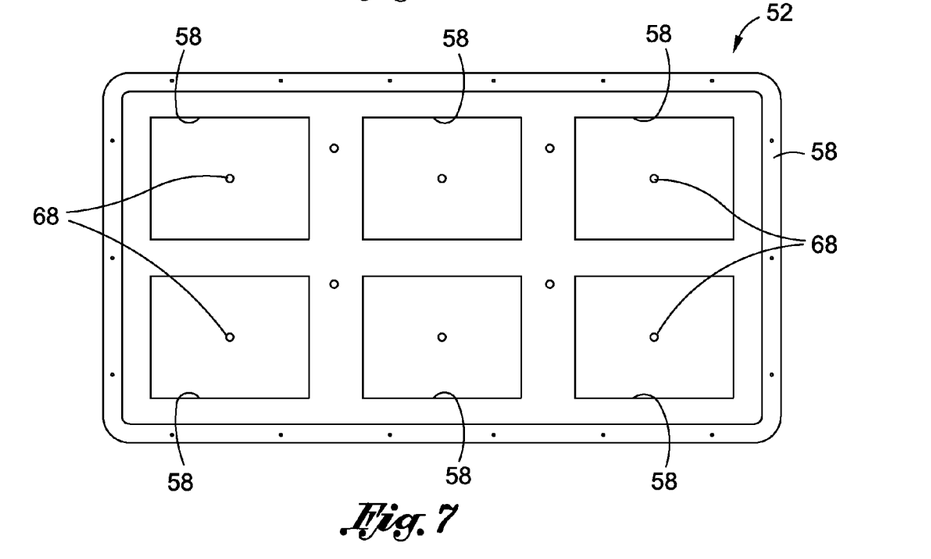
FIG. 7 is a bottom view of the upper plate illustrating undercuts which may optionally be provided therewith.
Figure 8:
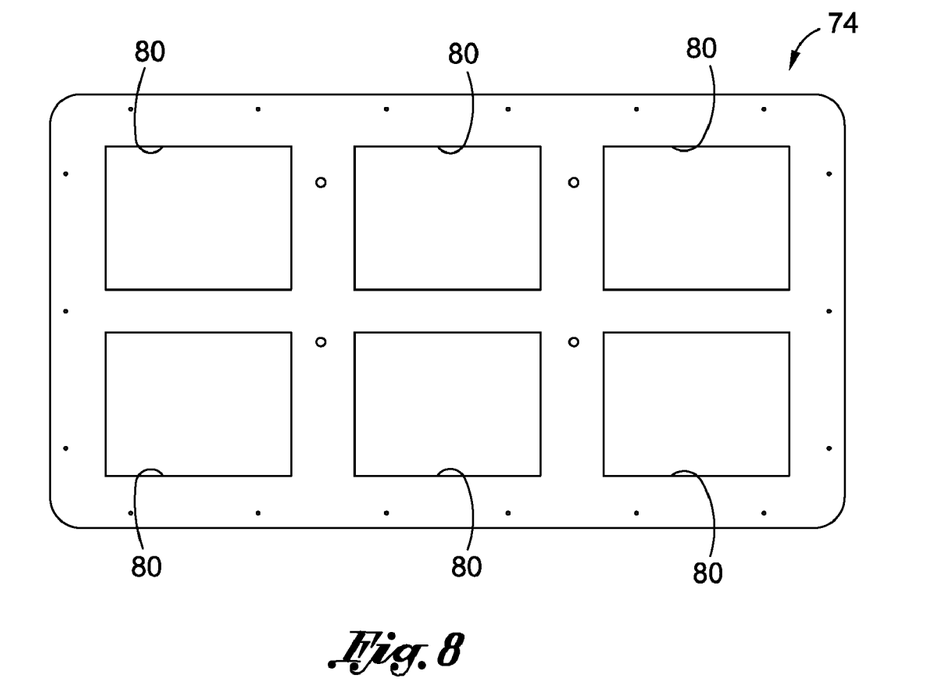
FIG. 8 is a plan view of the seal in one embodiment.

An exemplary embodiment of the seal 74 partially shown in FIG. 3A may be similar to that which is illustrated in FIG. 8 wherein the cutouts 80 may be similar in shape and size to undercuts 58 that may be formed in upper and lower plate 52, 54 shown in FIGS. 5 and 7. In the configuration shown in FIG. 3A, the upper and lower plates 52, 54 may be devoid of undercuts 58 which may otherwise be provided to facilitate fluid communication between the gas inlets 70 and the gas ports 68. The seal 74 may be clamped between the upper and lower plates 52, 54 as shown in FIG. 3A using any suitable mechanical or chemical fastening means or other suitable means.

Referring to FIG. 4, the seal 74 in another embodiment may extend along a periphery of the upper and lower plates 52, 54 and may be sandwiched or captured therebetween such that the seal 74 and the upper and lower plates 52, 54 collectively define the spacing 78. In this regard, the sandwiching of the seal 74 between the upper and lower plate 52, 54 creates a manifold between the gas inlets 70 of lower plate 52 and the gas ports 68 of upper plate 54. More specifically, the gas inlets 70 fluidly communicate with the gas ports 68 via the spacing 78 between the upper and lower plates 52, 54.

Although six gas ports 68 are shown in the upper plate 52, any number may be provided with a complementary number of gas lines 66 extending therefrom. Likewise, although the gas inlets 70 are illustrated in FIG. 4 as being uniformly distributed in approximately six sets or regions on the lower plate 54, any number of regions may be provided with any number of gas inlets 70 in each of the regions and in any shape or pattern.

Referring to FIG. 4, in order to facilitate fluid communication between the gas inlets 70 of the lower plate 54 and the gas ports 68 of the upper plate 52, it is contemplated that the undercuts 58 may be provided in strategic locations on an interior side of the upper and lower plates 52, 54. In addition, in order to facilitate positioning and capturing of the seal 74 along the periphery of the upper and lower plates 52, 54, a peripheral undercut 58 may be provided on the interior sides of at least one of the upper and lower plates 52, 54 as best seen in FIGS. 4-7.

The seal 74 may be maintained in position via a set of mechanical fasteners extended through the upper and lower plates 52, 54 in order to capture the seal 74 therebetween. However, it is contemplated that the seal 74 may be secured to the upper and lower plates 52, 54 via a variety of different attachment mechanisms including, but not limited to, bonding, frictional fit, clamping and a variety of other mechanisms including surface features which are configured to engage the seal 74 to the upper and lower plates 52, 54.

Furthermore, although the seal 74 is illustrated as being generally peripheral in its extension along the upper and lower plates 52, 54, it is contemplated that the seal 74 may comprise a continuous sheet of material extending across a width and length of the plate assembly 76 similar to that which is shown in FIG. 8. In this regard, the seal 74 may also include fluid passageways such as grooves or other elements formed therein or to facilitate fluid communication between the gas inlets 70 in the lower plate 54 and the gas ports 68 in the upper plate 52.

Regarding materials from which the upper and lower plates 52, 54 may be constructed, it is contemplated that any suitable material having sufficient strength, stiffness and heat resistance may be used. In one embodiment, the upper and lower plates 52, 54 may be constructed of an aluminum alloy although any other metallic and/or polymeric materials or combinations thereof may be used. Furthermore, the upper and lower plates 52, 54 may be fabricated of different materials which preferably have compatible coefficients of thermal expansion and which may also be compatible from a galvanic corrosion standpoint.

However, it is contemplated that slotted holes or other provisions may be provided in the seal 74 and/or upper and lower plates 52, 54 to prevent any issues associated with differences in coefficients of thermal expansion. Galvanic corrosion may be prevented by minimizing substantial contact between the upper and lower plates 52, 54. In this regard, it is contemplated that the inert gas disposed between the upper and lower plate 52, 54 may reduce galvanic corrosion. In addition, galvanic corrosion may be minimized by using the seal 74 as a spacer. It is contemplated that the seal 74 may be fabricated of any suitable material such as, without limitation, elastomeric material such as silicone rubber or other suitable polymeric materials. The seal 74 may facilitate sealing engagement of the cap assembly 50 to interior sides of the build frame 28.

Referring to FIG. 4, the upper plate 52 may include at least one and, more preferably, a pair of handles 56 or other mechanisms by which the upper plate 52 may be lifted and moved into position on the build frame 28. In this regard, it is contemplated that the handles 56 illustrated in FIG. 4 may be altogether omitted and the cap assembly 50 may include other suitable mechanisms for allowing lifting or otherwise positioning of the cap assembly 50 relative to the build frame 28.

Referring briefly to FIG. 5, shown is the upper plate 52 illustrating the formation of a plurality of undercuts 58 on an interior side of the upper plate 52 to facilitate fluid communication between the gas ports 68 of the upper plate 52 and the gas inlets 70 of the lower plate 54. Likewise, a similar set of undercuts 58 complementary in shape and size to those shown and illustrated on the upper plate 52 may be formed in the lower plate 54 on an interior side and/or upper side thereof for the same purposes. In addition, the peripheral configuration of the undercut 58 for mating of the seal 74 to a periphery of the upper and lower plates 52, 54 is shown in FIG. 5.

Referring briefly to FIG. 2, shown is the build frame 28 illustrating a lip 32 formed on a periphery of an upper side thereof. As can be seen, the lip 32 may extend upwardly from the side walls 30 of the build frame 28. In one embodiment, it is contemplated that the cap assembly 50 is sized and configured to fit within the lip 32 which may be an extension of an interior of the side walls 30. In this regard, it is contemplated that the cap assembly 50 is sized and configured to slidably fit within the lip 32 and is configured to move vertically up and down within an interior of the build frame 28. In this manner, the cap assembly 50 may move vertically with a part cake 42 comprising the build part contained within the unsintered powder inside the build chamber.

Referring to FIGS. 2 and 4, shown is the cap assembly 50 having the plurality of gas lines 66 extending to a respective one of the gas ports 68 on the upper plate 52. Although each one of the gas lines 66 may be individually connectable to a gas source 72, a distribution fitting 62 may be provided to interconnect the gas lines 66 to an appropriate gas source 72. In this regard, the distribution fitting 62 is preferably configured to be easily or conveniently connectable to the gas source 72 for delivering gas to the build volume 40. The distribution fitting 62 is preferably configured as a one-way quick disconnect valve wherein the valve is oriented to allow gas to flow from the gas source 72 into the distribution fitting 62 but preventing flow in an opposite directing toward the gas source 72. In this manner, pressure is maintained within the build volume 40 during delivery of the gas.

As shown in FIG. 4, the gas source 72 is configured to be connectable to the distribution fitting 62 in order to allow for delivery of gas thereto. The gas source 72 may be provided as any suitable gas storage mechanism including, but not limited to, gas bottles, gas tanks, compressors or any other mechanism for providing the desired inert gas to the build volume 40. The gas lines 66 may be fabricated of any suitable material such as, without limitation, flexible conduit including polymeric conduit such as polyethylene or nylon tubing.

Referring to FIG. 2, the cap assembly 50 may optionally include a valve 44 which may be mountable on the upper plate 52 in order to facilitate the maintenance of a desired pressure within the build frame 28. In this regard, the valve 44 is preferably configured as a one-way valve such as a bleed valve 44 and which is configured to vent the build volume 40. In this regard, the valve 44 is preferably oriented to prevent flow into the build volume 40 but allowing flow out of the build volume 40. Although shown as being installed on the upper plate 52, it is contemplated that the valve 44 may be installed in any location and in any quantity on the build frame 28 and/or on the cap assembly 50 to allow for venting of the build frame 28.

It should be noted that the incorporation of the valve 44 on the build frame 28 is optional and is dictated in part by the effectiveness of the seal 74 which seals the cap assembly 50 to the side walls 30 of the build frame 28. In addition, the effectiveness of a bottom seal 34 located between the build platform 36 and the build frame 28 may dictate, at least in part, the need for a bleed valve 44. For example, the fit between the bottom seal 34 of the build platform 36 and the side walls 30 of the build frame 28 may be relatively fluid tight reducing the need for the bleed valve 44. Likewise, the seal 74 between the cap assembly 50 and the build frame 28 may likewise be relatively fluid tight such that the bleed valve 44 is preferred to allow for venting of pressure inside the build frame 28 during the purging of the nitrogen gas or other inert gas.

Figure 9:
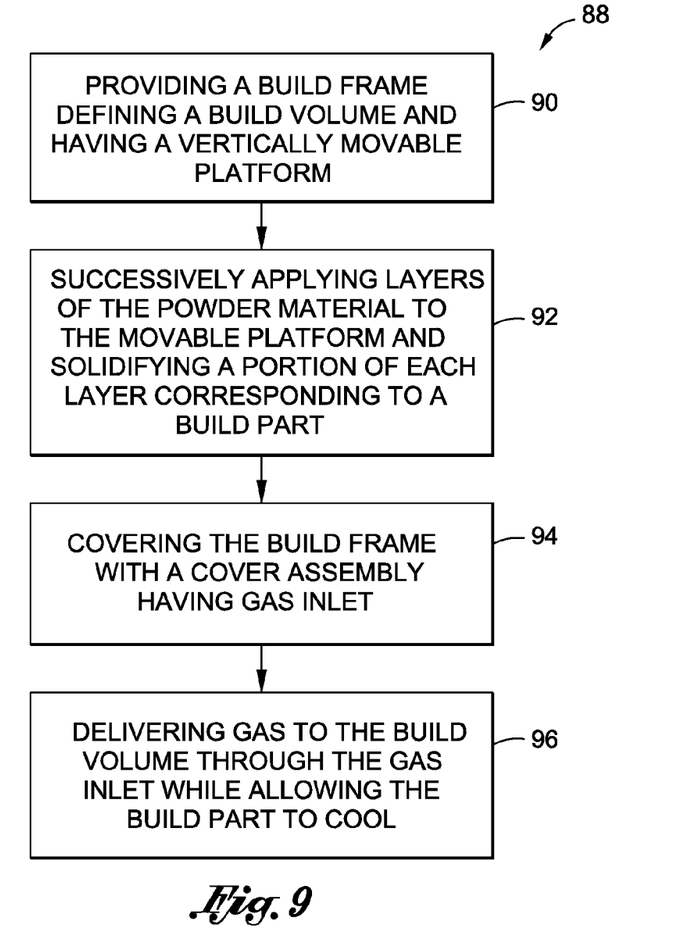
FIG. 9 is a flow diagram of a laser sintering methodology.

Operation of the SLS apparatus 10 and use of the build frame 28 and cap assembly 50 will now be described with reference to exemplary sintering method 88 shown in FIG. 9 and which may be performed or carried out using any one or more of the various components of the SLS apparatus 10 illustrated in FIGS. 1-8 to produce the build part 46 illustrated in FIGS. 3 and 10. In step 90, the build frame 28 may be provided having the movable platform 36. The platform 36 and the side walls 30 may collectively enclose the build frame 28 with optional bottom seal 34 sealing the platform 36 to the build frame 28. The build frame 28 may be installed inside the process chamber of the SLS apparatus 10 as shown in FIG. 1 such as via a forklift.

The doors 14 of the SLS apparatus 10 are closed and the laser sintering process initiated with step 92 of the sintering method 88 comprising successively applying layers of powder material over the build platform 36. The build platform 36 may be initially located at an upper position within the build frame 28. The layers of powder material are incrementally applied by the powder dispenser 24 onto the movable platform 36 followed by direct focusing of an energy beam such as the laser beam(s) 20 thereupon as illustrated in FIG. 3. Application of the laser beam 20 solidifies and unitizes a portion of each layer corresponding to the desired cross section of the build part 46 such that a complete three-dimensional build part 46 is constructed within the build frame 28. Following completion, the build part 46 may be embedded or buried within the part cake 42 which comprises the build part 46 and the unsintered powder material from which the build part 46 is fabricated.

Step 94 of sintering method 88 may further comprise the installation of cap assembly 50 after completion of the build part 46 as shown schematically in FIG. 3. The distribution fitting 62 which connects the gas lines 66 to the gas ports 68 is preferably connected to the gas source 72 to deliver inert gas such as nitrogen gas to the gas inlets 70. The distribution fitting 62 is preferably configured as a one-way valve to prevent the infusion of oxygen into the part cake 42 following completion of the build part.

Figure 10:
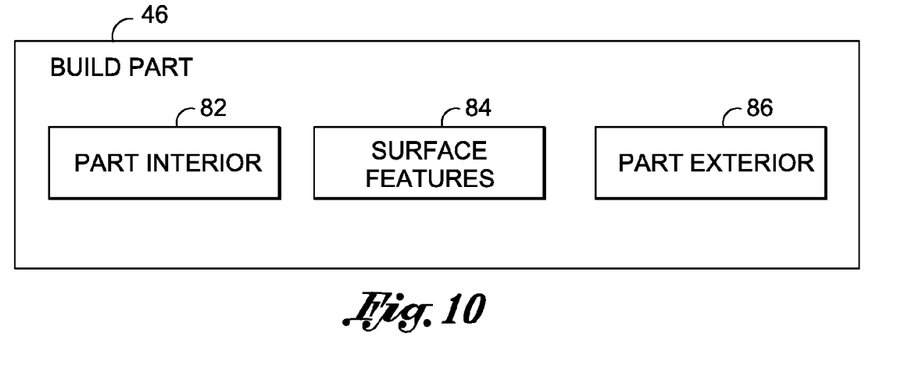
FIG. 10 is a block diagram of a build part.

As shown in FIG. 10, the build part 46 produced by exemplary sintering method 88 may include a part interior 82 such as a hollow interior although the part interior 82 may be solid or partially hollow. In addition, the build part 46 may include a part exterior 84 and various surface features 86 to form a variety of end-use build parts 46. Examples of the build part 28 include an environmental duct component for an aircraft 102 environmental system 130 and which may include various surface features 86 and geometries. However, the build part 28 produced by sintering method 88 may comprise any number of different configurations, shapes and sizes. Furthermore, the build part 46 produced by sintering method 88 may be used in a variety of industries including, but not limited to, aerospace, automotive and medical industries.

Step 96 of sintering method 88 may further comprise delivery of gas such as inert gas (e.g., nitrogen gas) through the gas lines 66 and into the gas ports 68. The gas may flow through the spacing 78 between the upper and lower plates 52, 54 and is distributed through the plurality of gas inlets 70 formed in the lower plate 52. The inert gas is preferably uniformly distributed throughout the part cake 42 and prevents the infusion of oxygen thereinto which would otherwise cause oxidation of the build part 46.

In one embodiment, and referring to FIG. 2, the build frame 28 may be vented via the incorporation of the one-way bleed valve 44. The bleed valve 44 is preferably configured as a one-way valve preventing entry of oxygen into the build volume 40 during the cooling of the build part 46. Following installation of the cap assembly 50 and delivery of inert gas to the build volume 40, the build frame 28 may be removed from the SLS apparatus 10 by opening the doors 14 shown in FIG. 1 and removing the build frame 28 with any suitable mechanism such as a forklift. A second build frame 28 may then be installed into the SLS apparatus 10 for fabrication of another set of build parts 46. In this manner, the cap assembly 50 improves productivity of the SLS apparatus 10 by minimizing down-time otherwise caused by the build frame 28 remaining inside the SLS apparatus 10 during the cooling period.

The build part 46 may be removed from the build frame 28 by slowly raising the build platform 36 vertically upwardly while the unsintered powder material is removed from the part cake 42 thereby exposing the build part 46. As was earlier mentioned, the cap assembly 50 facilitates injection of inert gas such as nitrogen gas into the build volume 40 in order to prevent oxidation of the build part 46. The build part 46 may be constructed of powder such as Nylon 11 powder material that is typically devoid of anti-oxidant agents and which therefore relies on the inert gas (i.e., nitrogen gas) to prevent infusion of oxygen into the build part 46 during the cool down process.

In this manner, the cap assembly 50 allows for removal of the build frame 28 from the SLS apparatus 10 after completion of the build part 46 minimizing wait time for the SLS apparatus 10 to cool down and thereby reducing lead time for build parts 46 by at least two days per build part 46. Following cool down, the gas source 72 may be disconnected from the distribution fitting 62 as illustrated in FIGS. 3 and 4. The cap assembly 50 may be removed from the build frame 28 and the build frame 28 moved to a break-out station in order to allow removal of the build part 46 in the manner as was earlier mentioned.

Figure 11:
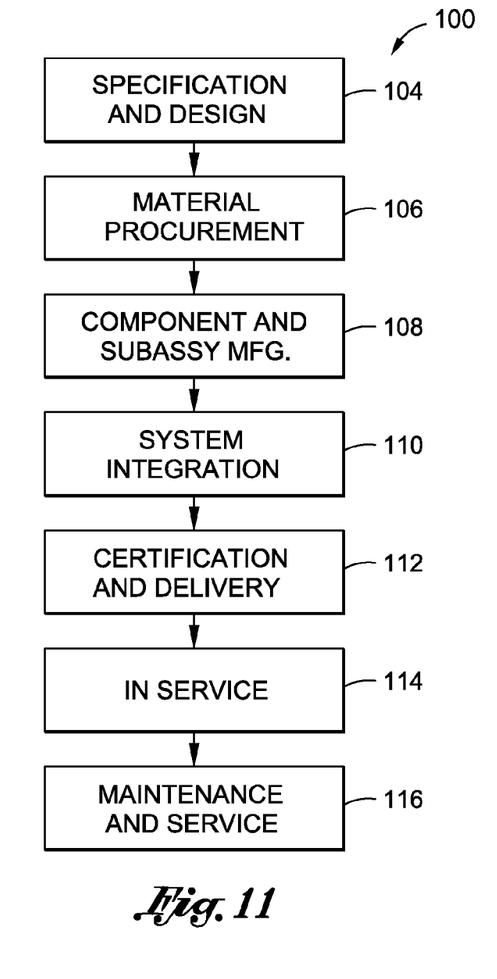
FIG. 11 is a flow diagram of aircraft production and service methodology.
Figure 12:
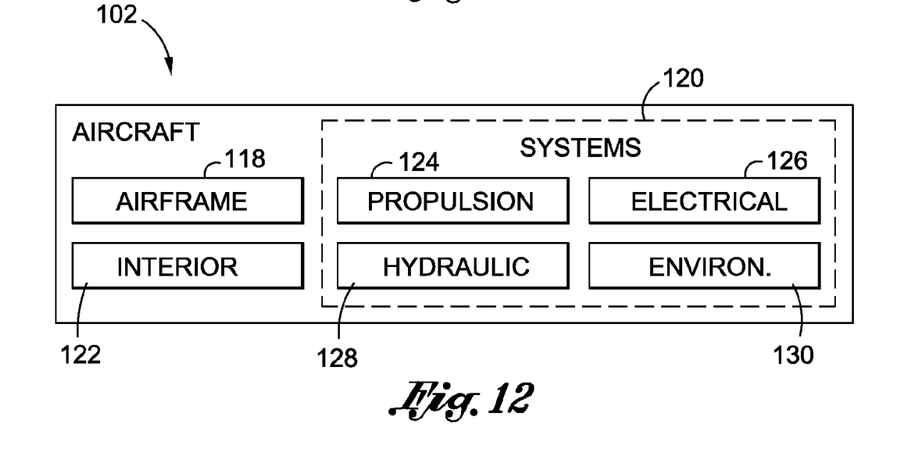
FIG. 12 is a block diagram of an aircraft.

Referring now to FIGS. 11 and 12, embodiments of the disclosure may be described in the context of an aircraft manufacturing and service method 100 as shown in FIG. 11 and an aircraft 102 as shown in FIG. 12. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

The above description is given by way of example, and not limitation. Given the above disclosure, one skilled in the art could devise variations that are within the scope and spirit of the embodiments disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A sintering cap assembly, comprising:
    a removable plate assembly of a laser sintering apparatus, the removable plate assembly having at least one gas inlet formed therein and being sized and configured to sealingly cover a build frame; and
    at least one gas line fluidly connectable to the gas inlet and being configured to deliver gas to the build frame.

2. The sintering cap assembly of claim 1 further comprising:
    at least one gas port disposable on the plate assembly and being configured to fluidly connect the gas line to the gas inlet.

3. The sintering cap assembly of claim 1 further comprising:
    a one-way bleed valve mountable on at least one of the cap assembly and the build frame;
    wherein:
    the build frame encloses a build volume;
    the one-way bleed valve being configured to vent the build volume.

4. The sintering cap assembly of claim 1 wherein:
    the plate assembly is comprised of upper and lower plates defining a spacing therebetween;
    a seal sandwiched between the upper and lower plates such that the seal and the upper and lower plates collectively enclose the spacing;
    the lower plate having a plurality of the gas inlets formed therein and being in fluid communication with the spacing and the gas port.

5. The sintering cap assembly of claim 4 wherein the seal extends along a periphery of the upper and lower plates.

6. The sintering cap assembly of claim 4 wherein the gas inlets are substantially uniformly distributed throughout the lower plate.

7. The sintering cap assembly of claim 6 wherein the lower plate includes a plurality of undercuts formed on an interior side thereof and having the gas inlets formed in the undercuts.

8. The sintering cap assembly of claim 4 further comprising:
    a plurality of the gas ports being disposed on the plate assembly and configured to fluid communicate with the gas inlets; and
    a distribution fitting configured to have the gas ports connected thereto.

9. The sintering cap assembly of claim 8 further comprising:
    a gas source configured to be connectable to the distribution fitting for delivering gas thereto.

10. A laser sintering apparatus adapted to contain a build frame, the laser sintering apparatus comprising:

a sintering cap assembly including:
a removable plate assembly having at least one gas inlet formed therein and being sized and configured to sealingly cover the build frame;
at least one gas line fluidly connectable to the gas inlet and being configured to deliver gas to the build frame; and
a bleed valve mounted on the build frame and being configured to vent the build frame.

11. The laser sintering apparatus of claim 10 wherein:
the plate assembly is comprised of upper and lower plates defining a spacing therebetween;
a seal sandwiched between the upper and lower plates such that the seal and the upper and lower plates collectively enclose the spacing;
the lower plate having a plurality of the gas inlets formed therein and being in fluid communication with the spacing and the gas port.

12. The laser sintering apparatus of claim 11 wherein the seal extends along a periphery of the upper and lower plates.

13. The laser sintering apparatus of claim 10 wherein the gas inlets are substantially uniformly distributed throughout the lower plate.

14. The laser sintering apparatus of claim 13 further comprising:
a plurality of the gas ports being disposed on the plate assembly and configured to fluid communicate with the gas inlets; and
a distribution fitting configured to have the gas ports connected thereto.

15. A laser sintering apparatus adapted to contain a build frame, the laser sintering apparatus comprising:
a cap assembly including:
a removable plate assembly comprised of upper and lower plates defining a spacing therebetween, the plate assembly being sized and configured to sealingly cover the build frame;
a seal extending along a periphery of the upper and lower plates and being sandwiched therebetween such that the seal and the upper and lower plates collectively enclose the spacing;
the lower plate having a plurality of the gas inlets substantially uniformly distributed throughout the lower plate and being in fluid communication with the spacing and with the gas ports, the lower plate including a plurality of undercuts formed on an interior side thereof and having the gas inlets formed in the undercuts;
the upper plate having a plurality of gas ports formed therein and having undercuts formed on an interior side of the upper plate, the gas ports being formed in the undercuts;
a distribution fitting;
a gas source configured to contain inert gas and being connectable to the distribution fitting; and
a one-way bleed valve mountable on at least one of the cap assembly and the build frame and being configured to vent the build frame.

16. A method of forming a build part from powder material by laser sintering, the method comprising the steps of:
providing a build frame defining a build volume and having a vertically movable platform;
applying successive layers of the powder material to the movable platform and solidifying a portion of each layer corresponding to a desired cross section of the build part;
covering the build frame;
delivering gas to the build volume through the gas inlet while allowing the build part to cool; and
venting the build volume through a bleed valve mounted on the build frame.

17. The method of claim 16 wherein the step of venting the build volume comprises:
venting the build volume during delivery of the gas thereto.

18. The method of claim 16 wherein the gas is a nitrogen-based gas.

19. The method of claim 16 wherein the powder material is devoid of antioxidants.

20. The method of claim 19 wherein the powder material is a polycrystalline polymeric material.

21. A method of forming a build part by laser sintering powder material devoid of anti-oxidants and using a selective laser sintering (SLS) apparatus, the method comprising the steps of:
providing a build frame defining a build volume and having a vertically movable platform;
providing a cap assembly having a one-way bleed valve mounted thereon, the cap assembly including a plurality of gas ports and a plurality of gas inlets;
installing the build frame into the SLS apparatus;
applying successive layers of the powder material to the movable platform and solidifying a portion of each layer corresponding to a desired cross section of the build part;
installing the cap assembly on the build frame;
providing a gas source containing nitrogen gas;
connecting the gas ports to the gas source;
delivering the nitrogen gas to the gas ports;
distributing the nitrogen gas through the gas inlets and into the build volume; and
venting the build volume through the one-way bleed valve during delivery of the nitrogen gas while allowing the build part to cool.

\* \* \* \* \*